United States Patent [19]

Baier et al.

[11] Patent Number: 5,705,009
[45] Date of Patent: Jan. 6, 1998

[54] PROCESS FOR PRODUCING AN INSULATION SYSTEM

[75] Inventors: Michael Baier, Mannheim; Henning Oetzmann, Sandhausen; Peter Klee, Waldmichelbach, all of Germany

[73] Assignee: ABB Patent GmbH, Mannheim, Germany

[21] Appl. No.: 513,765
[22] PCT Filed: Dec. 19, 1994
[86] PCT No.: PCT/EP94/04223
  § 371 Date: Nov. 17, 1995
  § 102(e) Date: Nov. 17, 1995
[87] PCT Pub. No.: WO95/17755
  PCT Pub. Date: Jun. 29, 1995

[30] Foreign Application Priority Data

Dec. 22, 1993 [DE] Germany .................. 43 43 846.6
Jul. 28, 1994 [DE] Germany .................. 43 26 695.2

[51] Int. Cl.⁶ .................................................. H02K 15/12
[52] U.S. Cl. .................. 156/192; 156/245; 156/273.9; 156/274.2; 156/275.5; 156/285; 427/116; 174/121 SR; 174/122 C; 174/124 GC
[58] Field of Search ............................ 427/116, 496, 427/508, 117, 177–179; 174/121 SR, 122 G, 122 C, 120 C, 124 G, 124 GC; 156/53, 185, 192, 242, 245, 273.9, 274.2, 272.2, 275.5, 285

[56] References Cited

U.S. PATENT DOCUMENTS

| | | | |
|---|---|---|---|
| 4,332,836 | 6/1982 | Urban | 427/116 |
| 4,374,066 | 2/1983 | Crivello | 260/440 |
| 4,418,241 | 11/1983 | Fujiwara | 174/121 SR |
| 5,466,492 | 11/1995 | Kiebling et al. | 427/116 |

Primary Examiner—Steven D. Maki
Assistant Examiner—Michael A. Tolin
Attorney, Agent, or Firm—Herbert L. Lerner; Laurence A. Greenberg

[57] ABSTRACT

This invention relates to a process for producing an insulation system (1) for an electrically conductive component (10). Use is made of an insulating material (5) which is protected against damage by the partial discharge of electric fields. To produce the insulating material (5), a substrate material (2) having an insulating coating (3) on one or both of its surfaces is impregnated with a chemical compound (4). This is hardened by radiation polymerisation and/or the application of heat to secure the insulating material (5) and bond the insulation system (1) permanently to the component (10).

7 Claims, 1 Drawing Sheet

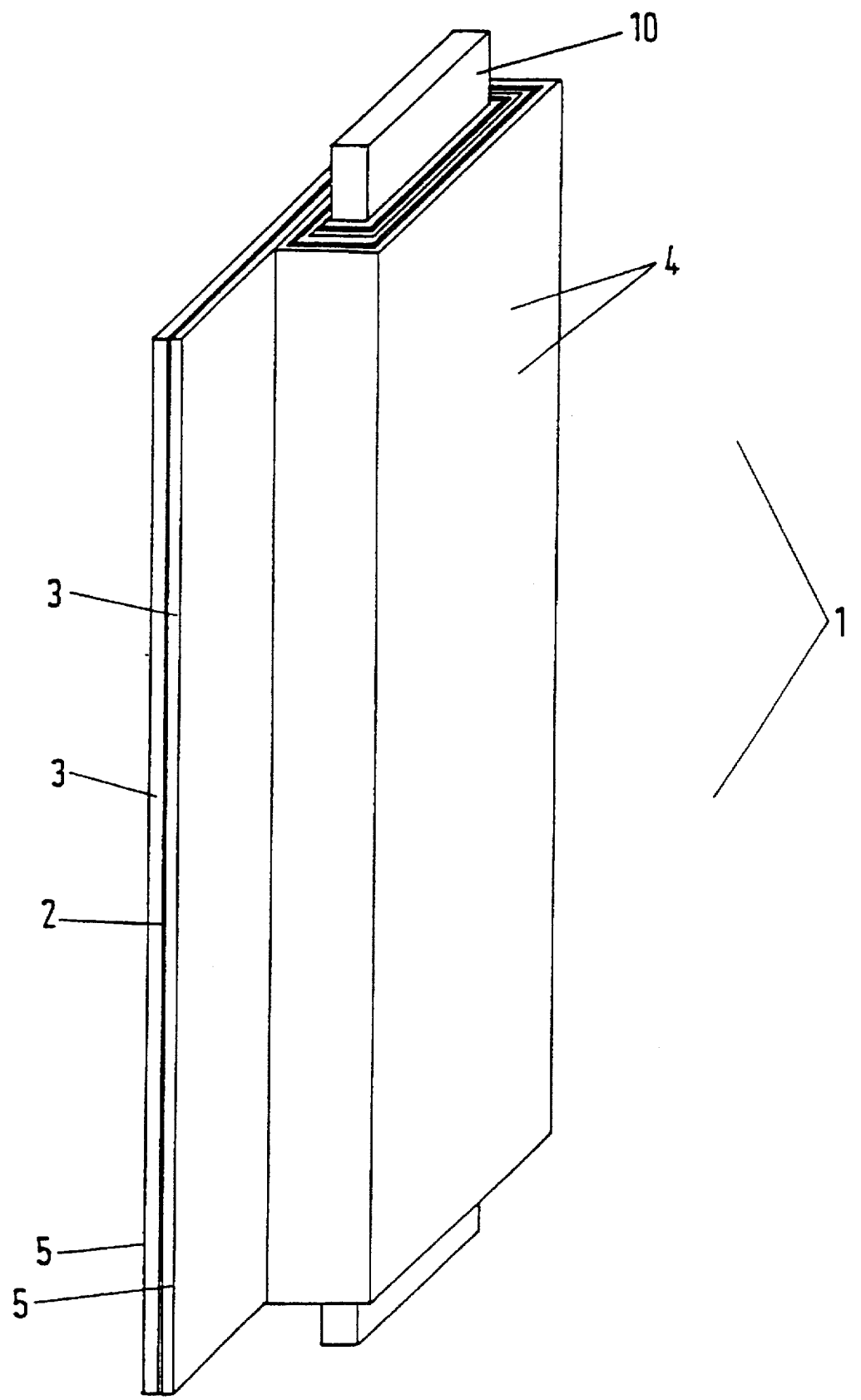

PROCESS FOR PRODUCING AN INSULATION SYSTEM

BACKGROUND OF THE INVENTION

FIELD OF THE INVENTION

The invention relates to a process for producing an insulation system for electrically conductive components having an insulating material, which is protected against partial discharge.

Such an insulation system is especially suitable for components of rotating electrical machines, the insulation systems of this kind known until now have been formed from strips of glass cloth that have a coating of mica. This reduced damage to the insulation system that is caused by partial discharges of electrical fields, for example in air inclusions in the insulation system. The cloth strips provided with the coating are wound around the components to be insulated. The solidification of the insulating material and its permanent bond to the component are effected with the aid of a resin.

In one known process, the strips are impregnated with the resin prior to being wound. The resin is dried before the winding and hardened after the winding. The hardening of the resin is effected by hot pressing in forming tools.

In another known process, the glass cloth strips, provided with the mica coating, are wound directly around the components to be insulated. The resin is then introduced into the insulation system by means of vacuum/pressure impregnation and is hardened thermally. Both processes are labor- and cost-intensive. In the latter process described, for technical production reasons, large amounts of liquid resin must be kept on hand and attended to, which represents a potential threat to work places and to the environment.

SUMMARY OF THE INVENTION

The object of the invention is to disclose a process with which an insulation system for electrically conductive components can be produced in an energy- and time-saving way as well as economically and in an environmentally friendly way, while circumventing the disadvantages referred to above.

This object is attained in accordance with the invention in that the insulating material is impregnated with a chemical compound, which is hardened by means of radiation polymerization or by radiation polymerization and the application of heat, or is hardened solely thermally, in order to solidify the insulation system and permanently bond it to the component.

In the process of the invention, an insulating material is first produced from a substrate material in the form of strips, sheets or mats. They are made from glass cloth, polyether ether ketone, polyethylene naphthalate, or polysulfone. The substrate material is provided on one or both sides with a coating of $SiO_x$, $Al_2O_3$, $Cr_2O_3$ or mica, where x can assume a value of 2 or less. With the aid of this coating, damage to the insulation system which can be caused by partial discharges of electrical fields, for instance in air inclusions in the insulation system, is reduced. The insulating material is then impregnated with a chemical compound. This compound is chosen such that it can be hardened by means of radiation polymerization, or by means of radiation polymerization and the application of heat, or thermally alone. The chemical compound is chosen such that its polymerization can be activated by means of UV radiation or electron beam radiation. The activation of the polymerization is effected by means of UV radiation, which preferably has a wavelength between 200 nm and 500 nm. The use of electron beam radiation in a range between 150 keV to 4.5 MeV is also possible. According to the invention, the insulating material can also be impregnated with an organically modified ceramic. The organic ingredient of this ceramic comprises epoxy, acrylate or vinyl groups. The polymerization of the organic ingredient in the ceramic is likewise accomplished by radiation polymerization, with or without the application of heat, or solely by means of the application of heat. If the insulating material is impregnated with a modified ceramic, then it is optionally possible to omit a coating of the above-described type, since the ceramic itself is capable of reducing damage from partial discharges. With the aid of the modified ceramic it is also possible to bond the coatings of mica permanently to the substrate material for producing the insulating material.

The solidification and bonding of the impregnated insulating material to the component that is to be insulated can be attained for instance by first irradiating the impregnated insulating material and then winding it around the component to be insulated. By a suitable choice of the chemical compound used for the impregnation, it is possible to have the polymerization and hardening take place at room temperature during and after the winding.

The insulating material can also be provided with an impregnation of such a kind that the polymerization takes place only after the component is wrapped with the insulating material, at elevated temperature. To that end, the insulating material is first impregnated. Next, to activate the polymerization, it is irradiated, and after that it is wrapped around the component. The polymerization and hardening take place after the wrapping of the component at a temperature of 50° C. or a temperature above that.

The impregnated insulating material can also be irradiated in the winding, and the impregnation can simultaneously be polymerized and hardened at a defined pressure, which is exerted upon the insulating material for shaping it. The impregnated insulating material can on the other hand also be first wound entirely around the component to be insulated. Next, the polymerization is activated by irradiating the insulated component. The polymerization and the hardening proceed after that, at a defined temperature. If the insulating material is impregnated with an organically modified ceramic, then the polymerization and hardening can by way of example be accomplished solely by means of heat treatment. Once again, however, the possibility exists of activating the polymerization of the organic ingredient in this ceramic by means of the above-described radiation. Further characteristics essential to the invention are defined by the dependent claims.

The invention will be described below in conjunction with a schematic drawing.

DESCRIPTION OF THE PREFERRED EMBODIMENT

The single drawing figure for the description shows a rodlike component 10 of rectangular cross section. This component 10 is a component of a rotating electrical machine (not shown here). The component 10 is provided with an insulation system 1 with the aid of the process according to the invention. To form a suitable insulating material, a striplike substrate material 2 is for instance used. Substrate materials in the form of mats or sheets may also be used. The substrate material used is fabricated for instance from glass cloth, polyether ether ketone, polyethylene terephthalate, polyethylene naphthalate, polysulfone or aramide cloth. In the exemplary embodiment shown here, the substrate material 2 is formed of glass cloth in strips. To reduce damage to the insulation system 1 from partial discharges from electrical fields, the substrate material 2 has a coating 3, which is formed of $SiO_x$, $Al_2O_3$, $Cr_2O_3$ or mica, or a material with similar properties. X has a value of 2 or less. The coating 3 can be disposed on one or both surfaces of the substrate material 2. This forms an insulating material 5, which is wound around the component 10. In order for the insulation system 1 to gain the requisite strength and to remain permanently bonded to the component 10, the insulating material 5, before being wound around the component 10, is impregnated with a chemical compound which contains at least one organic ingredient. Preferably, the impregnation of the insulating material 5 is done with a resin, which may have an additive in the form of a photoinitiator. Suitable resins are epoxy resins in the form of cycloaliphates, aromates, diglycidyl ethers or diglycidyl esters, or acrylates, or urethanes, polyesters, silicones, unsaturated polyester imides or unsaturated polyester resins. The impregnating material 4 may contain an additive of photoinitiators in a proportion of at least 0.5 to 10 weight %, referred to the total weight of the impregnating material 4. Preferably, photoinitiators in the form of iron hexafluorophosphate, triaryl sulfonium salt, bisacylphosphine oxide, benzyldimethylaminobutanone, benzildimethylketal, methylmorpholinopropanone, benzoin ether or benzophenone are used. The impregnation of the insulating material 5 can on the other hand also be done with an organically modified ceramic. The solidification of the insulating material 5 and its bonding to the component 10 is accomplished, depending on the composition of the chemical compound 4, by radical or cationic radiation polymerization and hardening of the impregnation 4. The polymerization is activated with the aid of UV radiation at a wavelength of between 200 nm and 500 nm. The use of electron beam radiation in a range between 150 keV and 4.5 MeV is also possible.

The insulating material 5 impregnated with the chemical compound 4 is first irradiated and then wound around the component 10. The polymerization and hardening of the impregnation 4 is then done at room temperature. This process is possible because of the suitable choice of the resin and of an additive that furnishes cations. For this impregnation, a cycloaliphatic resin with an additive in the form of iron hexafluorophosphate or triaryl sulfonium salt is preferably used. The amount of the additive is from 0.5 to 10 weight %, referred to the total quantity of the impregnation 4 used.

On the other hand, the possibility also exists of carrying out the polymerization and hardening at elevated temperature. To that end, the impregnated and irradiated insulating material 5 is first wound around the component 10. The impregnation 4 is done with an aromatic or cycloaliphatic epoxy resin, which has an additive in the form of iron hexafluorophosphate or triaryl sulfonium salt. The quantity of additive is from 0.5 to 10 weight %, referred to the total weight of the impregnation 4 used. The polymerization and hardening are effected, after the winding, at a temperature of 50° C. or more. The insulation system 1 can be formed by pressing at the same time. Moreover, the polymerization and hardening at 50° C. and more can also be achieved by winding the impregnated and irradiated insulating material 5 around the component 10, with the component 10 heated to that temperature.

The process can also be carried out in such a way that the insulating material 5 is impregnated first. In that case, the impregnation 4 comprises a cycloaliphatic epoxy resin having at least one additive of from 0.5 to 10 weight % of iron hexafluorophosphate or triaryl sulfonium salt. On the other hand, such systems as acrylates, urethanes, polyesters, silicones or their derivatives can be used as radiation-hardenable resins. These systems are supplemented with from 0.5 to 10 weight % of bisacylphosphine oxide, benzyldimethylaminobutanone, benzildimethylketal, methylmorpholinopropanone, benzoin ether or benzophenone, referred to the total weight of the impregnation 4. The insulating material 5 is then wound around the component 10 and irradiated in the process. With the aid of pressing tools (not shown here), the insulation system 1 is put into a defined shape. With this choice of the impregnation 4, polymerization and hardening during the winding is possible by means of radiation, and the shaping by means of pressure is accomplished simultaneously.

In another embodiment of the process, the insulating material 5 is first impregnated with the chemical compound 4 and wound around the component 10. The impregnation 4 is formed by a cycloaliphatic or aromatic epoxy resin with at least one additive in the form of iron hexafluorophosphate or triaryl sulfonium salt. The proportion of additives here is from 1 to 10 weight %. The entire insulation system 1 is then irradiated. After that, the impregnation is polymerized and hardened at room temperature or a higher temperature.

As already mentioned above, the insulating material can also be impregnated with an organically modified ceramic. In that case, given an adequate resistance to partial discharge, it is possible to omit the coatings 3 on the surface of the substrate material 2. By way of example, the organically modified ceramic has an organic ingredient that is formed by epoxy, acrylate or vinyl groups. This organic ingredient and the ceramic lend the requisite strength to the insulation system 1 after hardening and assure a durable bond to the component 10. The hardening of the impregnating material 4 can, as in the above-described examples be effected by means of radiation polymerization or solely by the application of heat.

As already mentioned at the outset, the substrate material 2 is provided on one or both sides with a coating 3, to reduce damage to the insulation system 1 from partial discharges. The coating 3 comprises $SiO_x$, $Al_2O_3$, $Cr_2O_3$ or mica, or a material with similar properties. According to the invention, the possibility exists of durably bonding this coating 3 to the particular substrate material with the aid of this organically modified ceramic.

We claim:

1. A method for producing an insulation system for an electrically conductive component, the method which comprises:

selecting a substrate material for forming an insulating material;

impregnating the substrate material with an organically modified ceramic, the ceramic having an organic ingredient selected from the groups of epoxy, acrylate and vinyl for protecting against partial discharges;

winding the impregnated substrate material around an electrically conductive component for insulating the component;

irradiating the impregnated substrate material with UV radiation or electron beam radiation for activating the polymerization during or after the winding step; and polymerizing and hardening the organic ingredient of the organically modified ceramic for solidifying and permanently bonding the substrate material with the component.

2. The method according to claim 1, wherein the insulation system is formed with a substrate material of one of strips, sheets and mats, wherein the substrate material is fabricated from materials selected from the group consisting of glass cloth, polyether ether ketone, polyethylene terephthalate, polyethylene naphthalate, polysulfone and aramide cloth.

3. The method according to claim 1, which further comprises activating the radiation polymerization of the chemical compound by irradiating with UV radiation at a wavelength of 200 to 500 nm.

4. The method according to claim 1, which further comprises activating the radiation polymerization of the chemical compound by irradiating with electron beam radiation in the range from 150 keV to 4.5 MeV.

5. The method according to claim 1, which comprises impregnating the insulating material with a chemical compound of one of aromatic or cycloaliphatic epoxy resin, the resin having an additive of between 1 and 10% by weight, the additive selected from the group consisting of iron hexafluorophosphate and triaryl sulfonium salt; subsequently winding the insulating material around the component, and subsequently irradiating the entire insulating system and activating the polymerization; and polymerizing and hardening the impregnation at room temperature or at an elevated temperature.

6. A method for producing an insulation system for an electrically conductive component, the method which comprises:

selecting a substrate material for forming an insulating material;

impregnating the substrate material with an organically modified ceramic, the ceramic having an organic ingredient selected from the groups of epoxy, acrylate and vinyl for protecting against partial discharges;

winding the impregnated substrate material around an electrically conductive component for insulating the component; and polymerizing and hardening the organic ingredient of the organically modified ceramic by heating after the winding step for solidifying and permanently bonding the impregnated substrate material with the component.

7. The method according to claim 6, wherein the insulation system is formed with a substrate material of one of strips, sheets and mats, wherein the substrate material is fabricated from materials selected from the group consisting of glass cloth, polyether ether ketone, polyethylene terephthalate, polyethylene naphthalate, polysulfone and aramide cloth.

* * * * *

UNITED STATES PATENT AND TRADEMARK OFFICE
CERTIFICATE OF CORRECTION

PATENT NO : 5,705,009
DATED    : January 6, 1998
INVENTOR(S): Michael Baier et al.

It is certified that error appears in the above-identified patent and that said Letters Patent are hereby corrected as shown below:

On the title page:

Item [30] should read as follows:

```
Dec. 22, 1993   [DE]   Germany ......43 43 846.6
Jul. 28, 1994   [DE]   Germany ......44 26 695.2
```

Signed and Sealed this

Tenth Day of March, 1998

*Attest:*

BRUCE LEHMAN

*Attesting Officer*  *Commissioner of Patents and Trademarks*